UNITED STATES PATENT OFFICE.

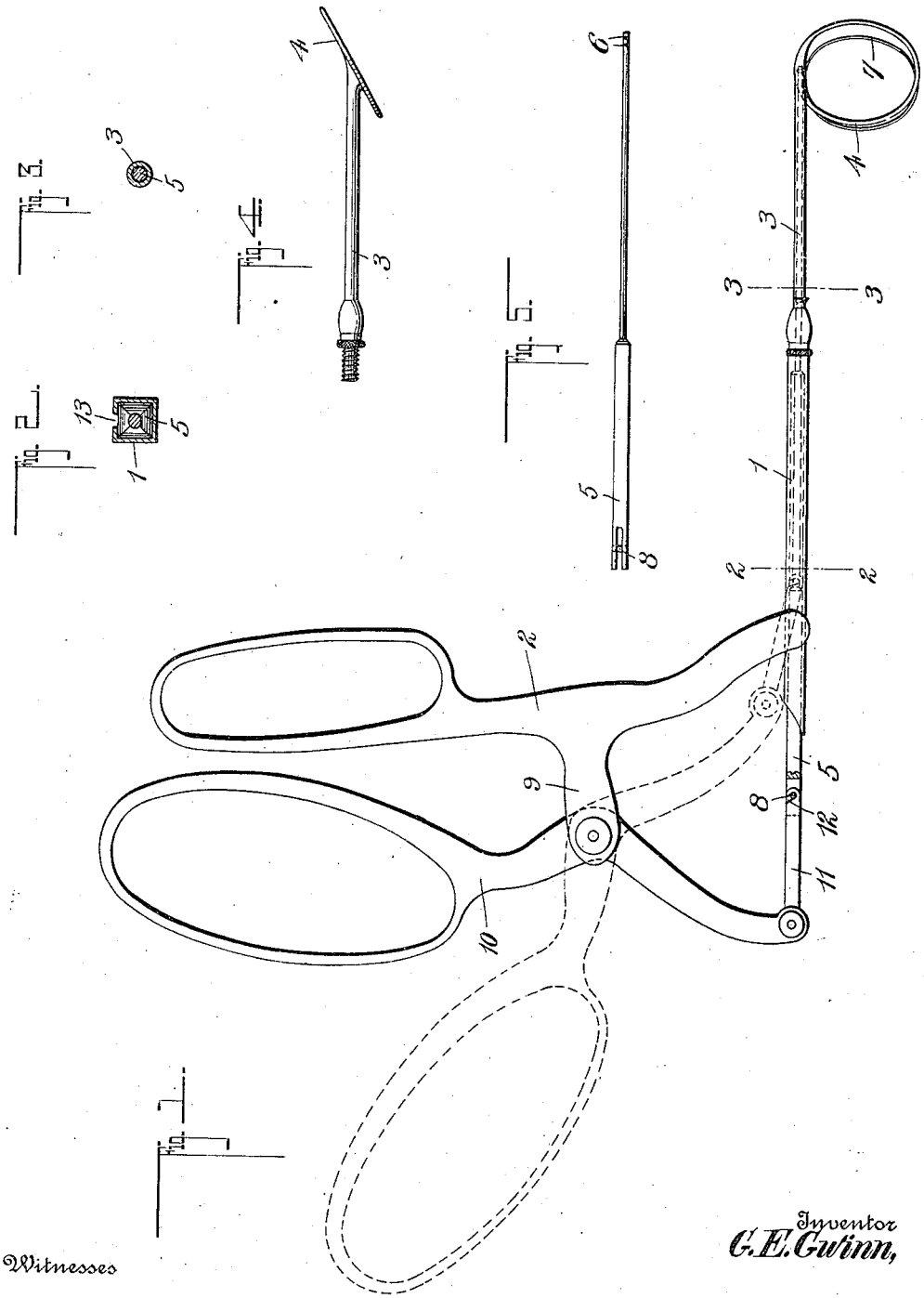

GEORGE EDWARD GWINN, OF SAN ANTONIO, TEXAS.

SURGICAL INSTRUMENT.

974,879.  Specification of Letters Patent.  Patented Nov. 8, 1910.

Application filed January 29, 1910. Serial No. 540,896.

*To all whom it may concern:*

Be it known that I, GEORGE EDWARD GWINN, a citizen of the United States, residing at San Antonio, in the county of Bexar and State of Texas, have invented a new and useful Improvement in Surgical Instruments, of which the following is a specification.

This invention relates to a surgical instrument especially adapted for use as a tonsillotome, and the object of the invention is to permit the removal of the tonsil without the use of a form of instrument which will obstruct the vision, and a further object of the invention is to obtain a vertical cut.

In order to secure both the vertical cut and in order to prevent the cutting device or the operating handles from hiding the parts operated upon from the view of the surgeon, I have constructed a device containing the novel features hereinafter described, pointed out in the claims and shown in the accompanying drawings, in which:

Figure 1 is a side elevation, the parts being shown in dotted lines in a position ready for use, and in full lines to indicate the position occupied by the movable parts when a cut has been made. Fig. 2 is a section on the line 2—2 of Fig. 1. Fig. 3 is a section on the line 3—3 of Fig. 1. Fig. 4 is a detail view of a snare holder taken at right angles to Fig. 1. Fig. 5 is a detail plan view of a movable member adapted to carry a cutting wire.

In constructing the invention, I employ a rectangular tube 1 open at both ends and to which is connected a fixed handle 2, the said handle portion resting in a plane approximately at right angles to the tube 1. At one end the tube 1 is adapted to receive a reduced threaded end of a smaller cylindrical tube 3 which at its free end carries a snare 4, said snare being oval shaped, and having its major axis at a right angle to the tube 3 and its minor axis also arranged at an angle to the tube 3, as most clearly shown in Fig. 4. Slidable in the said tubes 1 and 3 is an operating rod 5 provided with a squared portion to work in the tube 1 and a reduced cylindrical portion to work through the tube 3, and said rod is perforated at one end as shown at 6 in order that a cutting wire 7 may be connected thereto, and at the opposite end the rod is longitudinally bifurcated and provided with a transverse pin 8. It will be obvious that the loop of the wire 7 will when the operating rod 5 is drawn rearwardly, work across the snare 4, thus performing the cutting operation, and owing to the position occupied by the snare and other parts a vertical cut can be obtained.

In order to operate the rod, the handle 2 is provided with a rearward extension 9 to which is pivoted a handle 10. This handle is pivotally connected to a link 11 and said link has adjacent its non-pivoted end an oblique slot 12, which slot engages the pin 8, the end portion of the link resting in the bifurcation of the rod 5. To permit the link to move the operating rod the necessary distance within the tube 1 the latter is slotted along one side as shown at 13.

When the movable handle 10 is thrown into position shown in dotted lines the cutting wire 7 will be in position for use, and upon drawing the handle 10 toward the handle 2 so that the parts occupy the position shown by the full lines, the rod 5 will be drawn rearwardly and partially out of the tube 1 thus drawing the wire loop across the snare.

What I claim is:

1. A device of the kind described comprising a rectangular tube, a second tube detachably connected to the first mentioned tube and in alinement with it, a snare carried by the second tube, said snare being oval in shape, and having its major axis at a right angle to the tube and its minor axis arranged oblique with respect to the axis of the tube, an operating rod working through said tubes, cutting means carried by said rod and operable in coöperation with the snare, a fixed handle carried by the first mentioned tube, a handle pivoted to the first mentioned handle, and a link pivotally connected to the movable handle and loosely and detachably connected to the rear end of the said rod.

2. A device of the kind described comprising a rectangular tube having its rear portion longitudinally slotted, a second tube carried by the first mentioned tube, a snare carried by the last mentioned tube, an operating rod slidable in said tubes, a fixed handle carried by the first mentioned tube and substantially at a right angle thereto, a lateral extension carried by said handle, a second handle pivotally mounted upon said extension, and a link, said link loosely connecting the movable handle and the rear end portion of the operating rod, the link being adapted to travel in the slot of the first mentioned tube.

3. A device of the kind described comprising a sectional tube, an oval snare carried by one of said sections, the major axis of said snare being at right angles to the tube, and the minor axis of the snare being also at an angle to the tube, an operating rod adapted to work through both sections, a cutting wire carried by one end of said rod and adapted to coöperate with the snare, a fixed handle carried by one section of the tube, a second handle pivotally supported from the first mentioned handle, the operating rod having its rear end bifurcated, a transverse pin passing through said bifurcated portion, and a link pivotally connected at one end to the second mentioned handle, and having an oblique slot adjacent the other end for engagement with said pin, one of the tube sections being slotted longitudinally to receive said link.

GEORGE EDWARD GWINN.

Witnesses:
J. D. GWINN,
M. J. SHEERAN.